US011565278B2

(12) United States Patent
Nour-Omid et al.

(10) Patent No.: US 11,565,278 B2
(45) Date of Patent: Jan. 31, 2023

(54) METHODS, SYSTEMS, AND DEVICES FOR DETECTING AND ANALYZING ACTIVATION OF A FLUID DISPENSER

(71) Applicant: VITALACY, INC., Los Angeles, CA (US)

(72) Inventors: Janel Nour-Omid, Los Angeles, CA (US); Tal Cohen, Los Angeles, CA (US); Don Jindra, Los Angeles, CA (US); Bahram Nour-Omid, Los Angeles, CA (US)

(73) Assignee: VITALACY, INC., Los Angeles, CA (US)

( * ) Notice: Subject to any disclaimer, the term of this patent is extended or adjusted under 35 U.S.C. 154(b) by 249 days.

(21) Appl. No.: 16/383,081

(22) Filed: Apr. 12, 2019

(65) Prior Publication Data
US 2019/0314843 A1    Oct. 17, 2019

Related U.S. Application Data

(60) Provisional application No. 62/657,481, filed on Apr. 13, 2018.

(51) Int. Cl.
| B05B 12/00 | (2018.01) |
| G06F 16/25 | (2019.01) |
| G05B 19/042 | (2006.01) |
| A47K 5/12 | (2006.01) |
| B05B 12/08 | (2006.01) |
| B05B 12/16 | (2018.01) |
| H04L 12/28 | (2006.01) |

(52) U.S. Cl.
CPC .......... *B05B 12/004* (2013.01); *A47K 5/1202* (2013.01); *A47K 5/1217* (2013.01); *B05B 12/081* (2013.01); *B05B 12/16* (2018.02); *G05B 19/042* (2013.01); *G06F 16/252* (2019.01); *G05B 2219/25257* (2013.01); *H04L 12/2854* (2013.01)

(58) Field of Classification Search
None
See application file for complete search history.

(56) References Cited

U.S. PATENT DOCUMENTS

| 2008/0131332 | A1* | 6/2008 | Nguyen | G08B 21/245 |
| | | | | 422/119 |
| 2015/0320255 | A1* | 11/2015 | She | G01H 1/00 |
| | | | | 426/231 |
| 2016/0274596 | A1* | 9/2016 | Buell | G05D 7/0676 |
| 2018/0080807 | A1* | 3/2018 | Singh | G01F 23/0007 |
| 2018/0336512 | A1* | 11/2018 | Clarke | G06Q 10/083 |
| 2018/0364672 | A1* | 12/2018 | Kamatchi | G05B 19/05 |

* cited by examiner

*Primary Examiner* — Paul B Yanchus, III
(74) *Attorney, Agent, or Firm* — ArentFox Schiff LLP

(57) ABSTRACT

Methods, systems, and devices for using a specialized sensor for detecting activation of a fluid dispenser and for using gathered data therefrom for a variety of purposes, including determining when to refill the dispenser, tracking and analyzing operation thereof, matching operation to expected or anticipated operation, and identifying specific users and specific incidents of use associated therewith. Also provided are use of remote data repositories and/or processing devices that for processing and use of such data.

16 Claims, 25 Drawing Sheets

METHODS, SYSTEMS, AND DEVICES FOR DETECTING AND ANALYZING ACTIVATION OF A FLUID DISPENSER

CROSS-REFERENCE TO RELATED APPLICATIONS

This application claims priority to U.S. Provisional Application No. 62/657,481, filed Apr. 13, 2018. The disclosure of the priority application is hereby incorporated in its entirety by reference.

TECHNICAL FIELD

Aspects of the present disclosure relate to methods, systems, and devices for detecting activation of a fluid dispenser.

BACKGROUND

Fluid dispensers are increasingly replacing bar soaps and liquid pumps to create a more sterile environment and eliminate the spreading of germs. Typically, a user's hand can be placed under a portion of a dispenser to activate a sensor integrated with the dispenser to dispense a fluid onto the user's hand. Dispensing may be generated manually (e.g., by the user manually activating a pump) or by sensing (e.g., a sensor of hand motion beneath the dispenser causes dispensing). An amount of fluid dispensed is generally predetermined and may vary among different manufacturers. Although the amount of fluid dispensed can be predetermined, there currently exists a need to know when to refill the dispenser without physical interaction with the dispenser. Further, there also exists a need to determine when individual users are actually using the dispenser to clean each user's hands.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure are directed to detecting an activation of a fluid dispenser and for using gathered information relating thereto for a variety of purposes, including determining when to refill the dispenser, tracking and analyzing operation of the dispenser, matching operation to an expected or an anticipated operation of the dispenser, and identifying specific users and specific incidents of use associated with such identified specific users. Aspects of the present disclosure provide methods, systems, and devices configured to monitor and detect when the fluid dispenser is activated and to gather data relating thereto for transmittal, for example, to one or more remote data repositories and/or processing devices that may be used for processing of such data and other purposes. The monitoring and detecting device may include a sensor capable of being attached to a wide range of fluid dispensers. Such device may be configured to sense motion relating to dispensing device operation. The sensed information from the dispenser may be used to determine, from a pattern of operation, such as vibrations, the type of dispenser and to monitor an associated pattern of motion to recognize each occurrence of the device being activated for dispensing. The sensor may also be configured to collect data relating to, or to interoperate with other features of the system, for recognizing dispenser operation. As such, the device may assist in determining when to refill the dispenser. The sensor may also obtain and/or provide other information, such as location, inertial motion, and other information detected by the sensor (e.g., detection of users of or persons proximal to the dispenser; communications with devices associated with such users or other persons, etc.).

Aspects of the present disclosure may further include various features for associating dispenser operation with an individual identified as proximal to the dispenser or having access to the dispenser, and associating specifically identified individuals with specific operation of a dispenser. Identification of an individual may occur via a variety of features, such as, but not limited to, use of a corresponding mechanism to the sensor that may be worn by a user to identify specifically an individual who may use the dispenser having the attached dispensing detection device, such as a readable or otherwise communicating wristband, badge, Bluetooth or other wireless communication device, and the like. Such devices may be read using a variety of methods, such as using radiofrequency identification (RFID) technology, wireless communication, or optical reading, such as via bar code reading technology or biometric identification. Alternatively, for example, the person may be identified inferentially using other system information, such as identification of access to a room or other location where the dispenser is located, or by virtue of the user using an RFID or other access device/system. Similarly, for example, video surveillance information may be used to associate a user accessing the dispenser area with the dispenser, or location information for the individual from other systems (e.g., global positioning system (GPS) or cellular location information) may be used to identify a person in the vicinity of the dispenser.

In accordance with aspects of the present disclosure, a database of motion patterns and other information associated with a plurality of dispensers may be used and/or developed. For example, acceleration patterns during use may be identified and stored for a wide range of dispensers. The pattern associated with each dispenser may be programmed in advance of detection of regular dispenser use, such as by activating, collecting, analyzing, and associating the unique pattern of vibration during use of each dispenser. Such programmed information may, for example, be stored in a data repository, including a library of dispensers and patterns. Upon installation of a detector with a new dispenser, for example, the type of dispenser may be determined based on one or more test dispensing operations, wherein such test operations are compared to the library of dispenser operation patters.

Alternatively, for example, each dispenser may be individually tested without the necessity of a prior database. For example, when a dispenser is installed, the dispenser may be tested when activated to dispense fluid to collect a suitable number of data collection patterns to enable creation of a dispensing detection pattern, which may then be stored for later use. For example, numerous activations may be performed to collect vibration patterns of the respective dispenser to ultimately determine a suitable minimum vibration pattern and/or acceleration or other data pattern associated with dispensing from that device. Then, each time that device is used for dispensing, such dispensing may be detected.

Yet additional features in accordance with aspects of the present disclosure include system features for allowing access to the data collected on dispensers and use thereof. For example, such system features may allow access to data from each dispenser, options for providing graphical display of locations and results, various features for assessing use, users, and relative use, as well as generating reports and other information resulting from review, presentation, and/or analysis of the data.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Various novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

Figure 1:
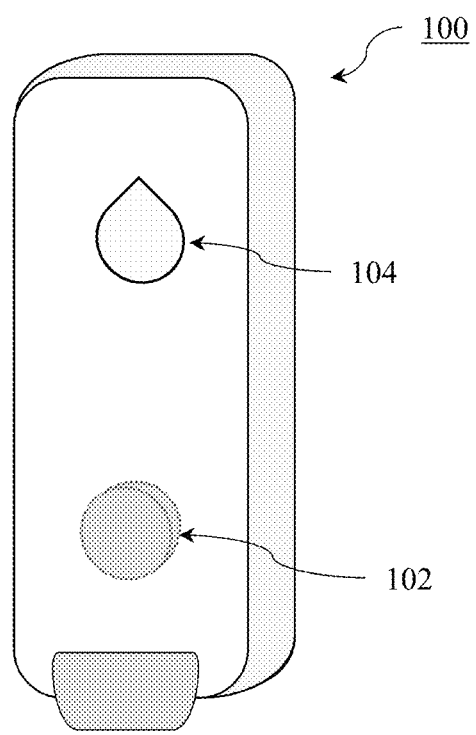
FIG. 1 is a schematic view of an example fluid dispenser with a dispenser sensor attached thereto, according to an aspect of the present disclosure.

Aspects of the present disclosure provide methods, systems, and devices for detecting activation of a fluid dispenser. FIG. 1 is a schematic view of an example fluid dispenser 100 (also interchangeably referred to herein as a "host device") with a sensor device 102 associated therewith, such as attached thereto, according to aspects of the present disclosure. Referring to FIG. 1, the dispenser 100 may include a window 104 for determining an amount of fluid in the dispenser 100. According to an aspect, the sensor device 102 may be attached to an outer portion of the dispenser 100 to detect vibration. In another example implementation, the sensor device 102 may be attached inside the dispenser 100 housing. The sensor device 102 may be situated at various locations, such as at a location to obtain the greatest range of vibration patterns detected by the sensor device 102 and/or to carry out other functions, such as user detection and/or communication functions.

Figure 2A:
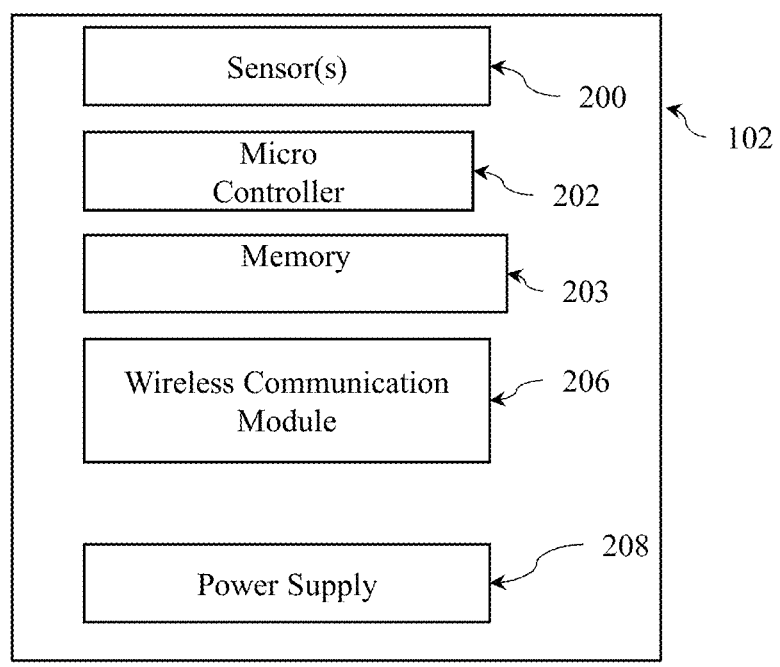
FIG. 2A is a schematic block diagram of an example dispenser sensor, according to an aspect of the present disclosure.

FIG. 2A is a schematic block diagram of various functional components of the sensor device 102 of FIG. 1. As shown in FIG. 2A, the sensor device 102 may include one or more sensors 200. For example, the one or more sensors 200 may be or include one or more accelerometers configured to detect accelerations in x, y, and z directions. In another aspect, the sensors 200 may be or include a gyroscope (not shown) to detect acceleration or vibration of the dispenser 100. In yet another aspect, the sensors may be or include one or more devices for obtaining user or device proximity information, such as an RFID reading device or and optical reader, such as via bar code reader or biometric identification device, such as a fingerprint reader or a camera for obtaining facial recognition information.

According to an aspect, the sensor device 102 may be configured to determine if the detected acceleration, vibration, or other motion from the dispenser 100, for example, corresponds to the dispenser 100 dispensing fluid or if the detected acceleration or vibration corresponds to a spurious vibration in which the dispenser 100 does not dispense fluid. For example, when the detected vibration has a pattern that matches a stored motion pattern corresponding to dispensing fluid, or where the vibration magnitude or frequency exceeds a predetermined threshold value, for example, the detected acceleration may correspond to the dispenser 100 dispensing the fluid. Conversely, when the detected vibration has a pattern that does not match a stored motion pattern corresponding to dispensing fluid, or if the magnitude or frequency falls below the predetermined threshold value, for example, the detected acceleration may be identified as not corresponding to dispensing fluid.

In accordance with aspects of the present disclosure, a database of motion patterns and other information associated with a plurality of dispensers may be developed for use with the sensor device 102. The pattern associated with each dispenser may be programmed in advance of detection of regular dispenser use, such as by activating, collecting analyzing, and associating the unique pattern of vibration during use of each dispenser. For example, acceleration patterns during use may be identified and stored for a wide range of dispensers. In one example implementation, such a database may be iteratively developed as dispensers are tested and dispensing motion patterns are identified and matched to each dispenser. Such programmed information may, for example, be stored in a data repository, including a library of dispensers and patterns. The data repository may be stored on the sensor device 102, for example, or at a remote location (e.g., on a server on a network, such as the Internet). Upon installation of a detector with a new dispenser, for example, the type of dispenser may be determined based on one or more test dispensing operations, wherein such test operations are compared to the library of dispenser operation patters.

Alternatively, for example, each dispenser may be individually tested without the necessity of use of a prior developed database. For example, when a dispenser is installed, the dispenser may be tested when activated to dispense fluid in order to collect a suitable number of data collection patterns to enable creation of a dispensing detection pattern, which may then be stored for later use for that specific dispensing device. For example, numerous activations may be performed to collect motion patterns of the respective dispenser to ultimately determine a suitable minimum motion pattern, e.g., a vibration pattern and/or acceleration or other data pattern associated with dispensing from that device. Then, each time that device is used for dispensing, such dispensing may be detected.

Figure 2B:
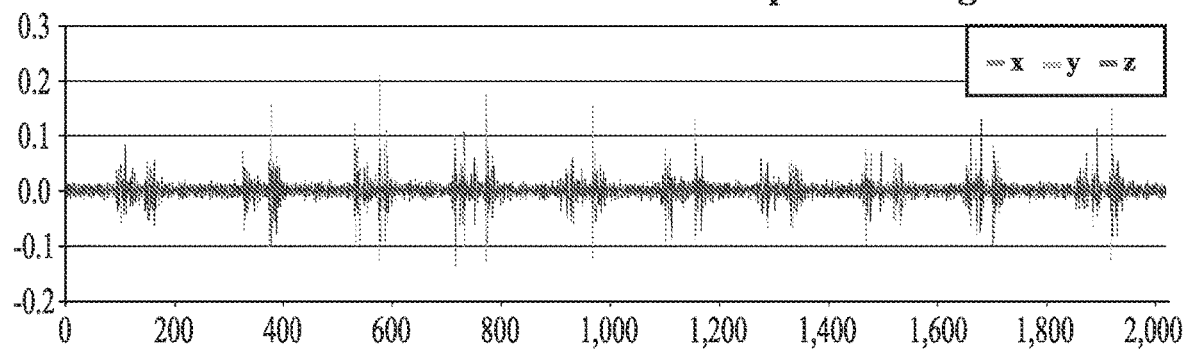
FIG. 2B shows an example pattern of activity data for an example dispenser during dispensing operation, for use in accordance with aspects of the present disclosure.
Figure 2C:
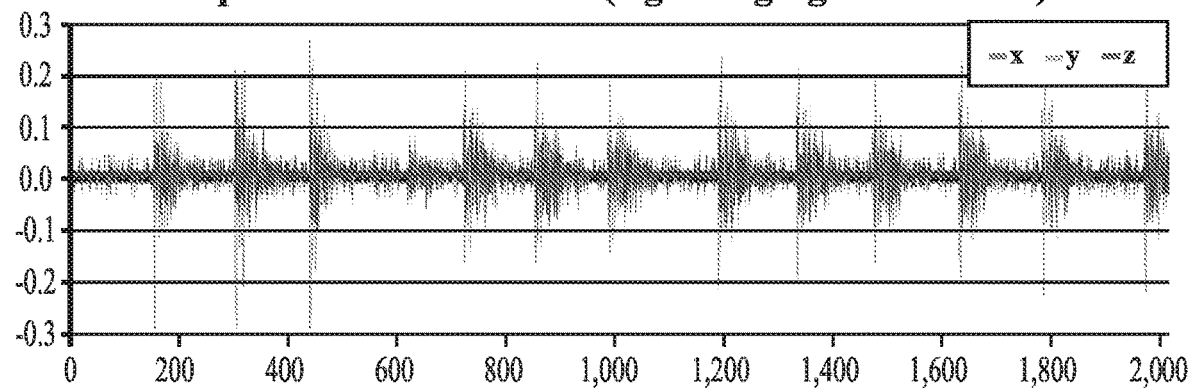
FIG. 2C shows an example pattern of activity data for an example dispenser during spurious activity, for use in accordance with aspects of the present disclosure.

As further shown in FIG. 2A, the sensor device 102 may also include a microcontroller or other processing device 202 configured to analyze data received from the one or more sensors 200. For example, after collection of acceleration, movement, or vibration pattern information, for example, the processing device 202 may be used to determine if the pattern information corresponds to pattern information for dispensing activity by the dispenser 100 (FIG. 1). For example, in one example implementation, the processing device 202 may analyze acceleration data received from the sensors 200 and compare this data to a known set of acceleration data associated with the dispensing of fluid from the dispenser 100 to determine if fluid dispensing from the dispenser 100 has occurred. In an aspect, the processing device 202 may be configured to characterize the motion patterns (acceleration data) to differentiate between, for example, the motion patterns associated with fluid dispensed from the dispenser 100 and the motion patterns associated with other spurious vibrations. Sample motion patterns associated with dispensing fluid and an example spurious motion pattern (e.g., vibrations caused by slamming a wall) are illustrated in FIGS. 2B and 2C, respectively.

The sensor device 102 may include a memory 203 configured to store the results of the analyzed acceleration data or vibration patterns associated with activity by the dispenser 100 (FIG. 1). The processing device 202 may retrieve the acceleration pattern for detected activity by the dispenser 100, and then compare the motion pattern of the detected activity to one or both of the stored motion patterns for dispensing (FIG. 2B) or spurious accelerations (FIG. 2C). Once such determination is completed, the results may be stored and/or transmitted (e.g., via a network to a remote server for storage in a data repository).

In yet another variation, the sensor device 102 may not carry out such comparison processing storage and processing, and the processing may instead entirely be carried out at a remote location. In this variation, the presence of a processing device 202 and/or the memory 203 within the sensor device 102 may be unnecessary.

The sensor device 102 may be configured with a wireless or other communication device 206 to communicate with other coupled system devices, such as one or more remote servers and/or other devices proximal to the sensor device 102, such as RFID devices, wireless routers, and/or user devices (e.g., cellular telephones). A power supply 208 may also be provided with the sensor device 102 and/or the sensor device 102 may be connected to a power supply for the dispenser 100 to facilitate operation of the sensor device 102. Similarly, aspects of the present invention may be used with and/or interoperate with the applicant's co-pending U.S. patent application Ser. No. 14/252,682 titled "Methods and Systems for Monitoring Hygiene Habits," having inventor Yossef Raichman, the entire contents of which are incorporated herein by reference.

Figure 3:
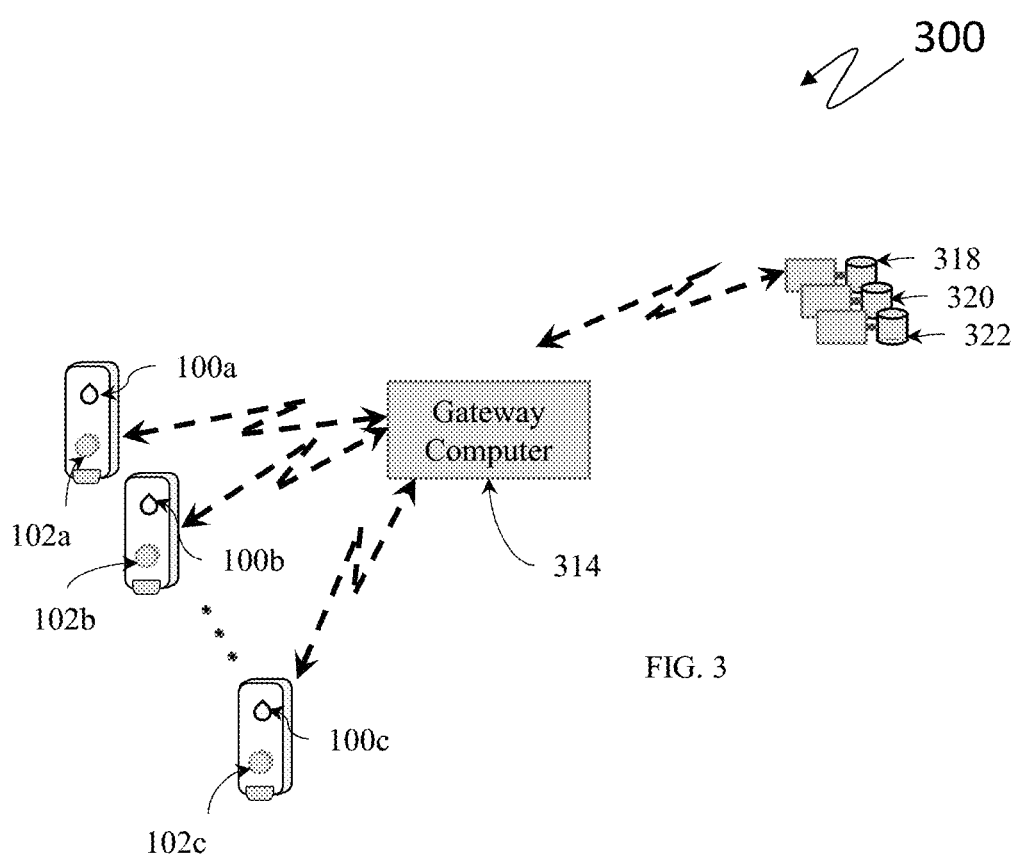
FIG. 3 is a representative diagram illustrating an example system for providing data communication from dispenser sensors to cloud computer servers, according to an aspect of the present disclosure.

FIG. 3 is a schematic diagram of one example set of system components for facilitating data communication among dispenser sensors and one or more remote devices, such as one or more cloud computer servers, according to an aspect of the present disclosure. Referring to FIG. 3, an example embodiment of the present disclosure may include various data communication system components 300 including dispensers 100a, 100b, 100c, which may, for example, be manufactured by a plurality of manufactures, each configured with a sensor device 102a, 102b 102c, respectively, similar to, for example, sensor device 102 of FIGS. 1 and 2. Each of the sensor devices 102a, 102b, and 102c may generate data associated with an identifiable action such as fluid dispensed from the corresponding dispenser 100a, 100b, 100c and may then communicate respective data with another device, such as a gateway computer 314. The gateway computer 314, for example, may be configured to communicate with each of the sensor devices 102a, 102b, 102c via various wireless communication protocols such as Bluetooth, or Zigbee, so as to gather dispenser activation data (e.g., data associated with dispenser activity). The data may be stored locally on the gateway computer 314, for example, and/or transmitted via wireless communication (e.g., on a wireless network not shown in FIG. 3) for storage, such as on one or more of cloud server computers 318, 320, and 322.

Figure 4:
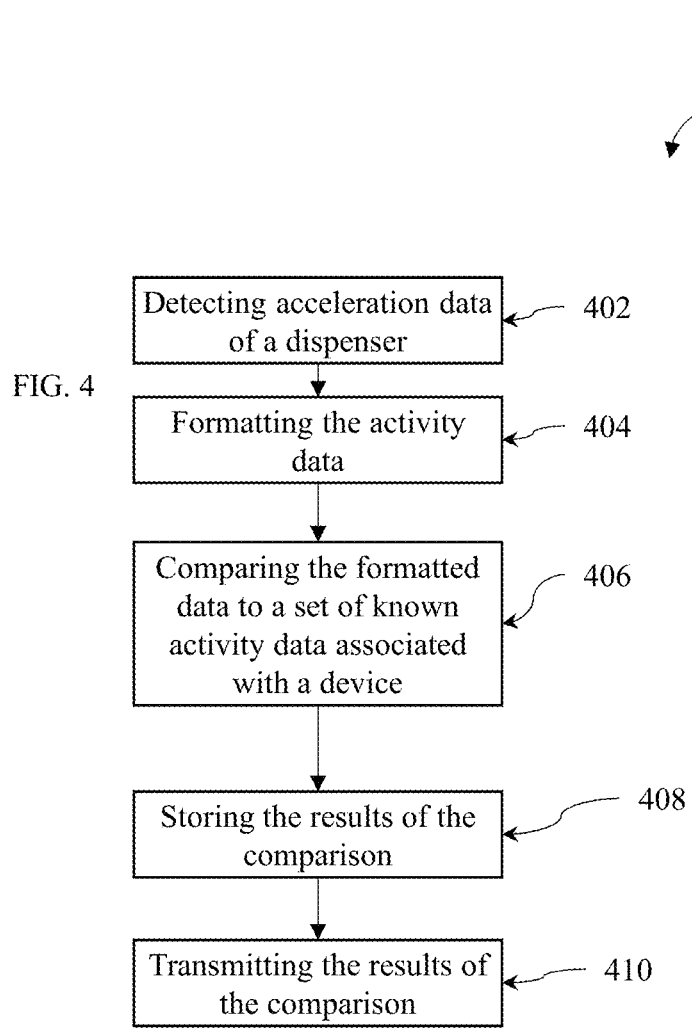
FIG. 4 is a flowchart of a method of detecting activity of a dispenser, according to an aspect of the present disclosure.

FIG. 4 is a flowchart of a method 400 of detecting activation of a dispenser sensor, according to an aspect of the present disclosure. Referring to FIG. 4, the method 400 may include detecting activity data for the dispenser 402, such as motion, acceleration, and/or vibration of dispenser 100 (FIG. 1) via the sensor device 102 (FIGS. 1 and 2). For example, the sensor device 102 may detect vibration in the dispenser 100 via one or more of detected accelerations in the x, y, and z directions. The method 400 may further include formatting the activity data 404 detected by the sensor device 102 (FIGS. 1 and 2) for use in comparing the data to stored data.

The method 400 may also include comparing the formatted activity data for the dispenser to a known set of activity data associated with an identifiable action that is in a comparable format (e.g., vibration activity (FIGS. 2B and 2C) for dispensing fluid by dispenser 100 (FIG. 1)). For example, vibration patterns may be compared to so as to differentiate between vibrations associated with dispensing fluid and other spurious vibrations that may be disregarded.

The method 400 may further include storing the results of the analyzed data associated with the identifiable action 408, and communicating the results of the analyzed data associated with the identified action 410, such as at gateway computer 314 or one or more of cloud server computer 318, 320, 322 (FIG. 3).

Figure 5:
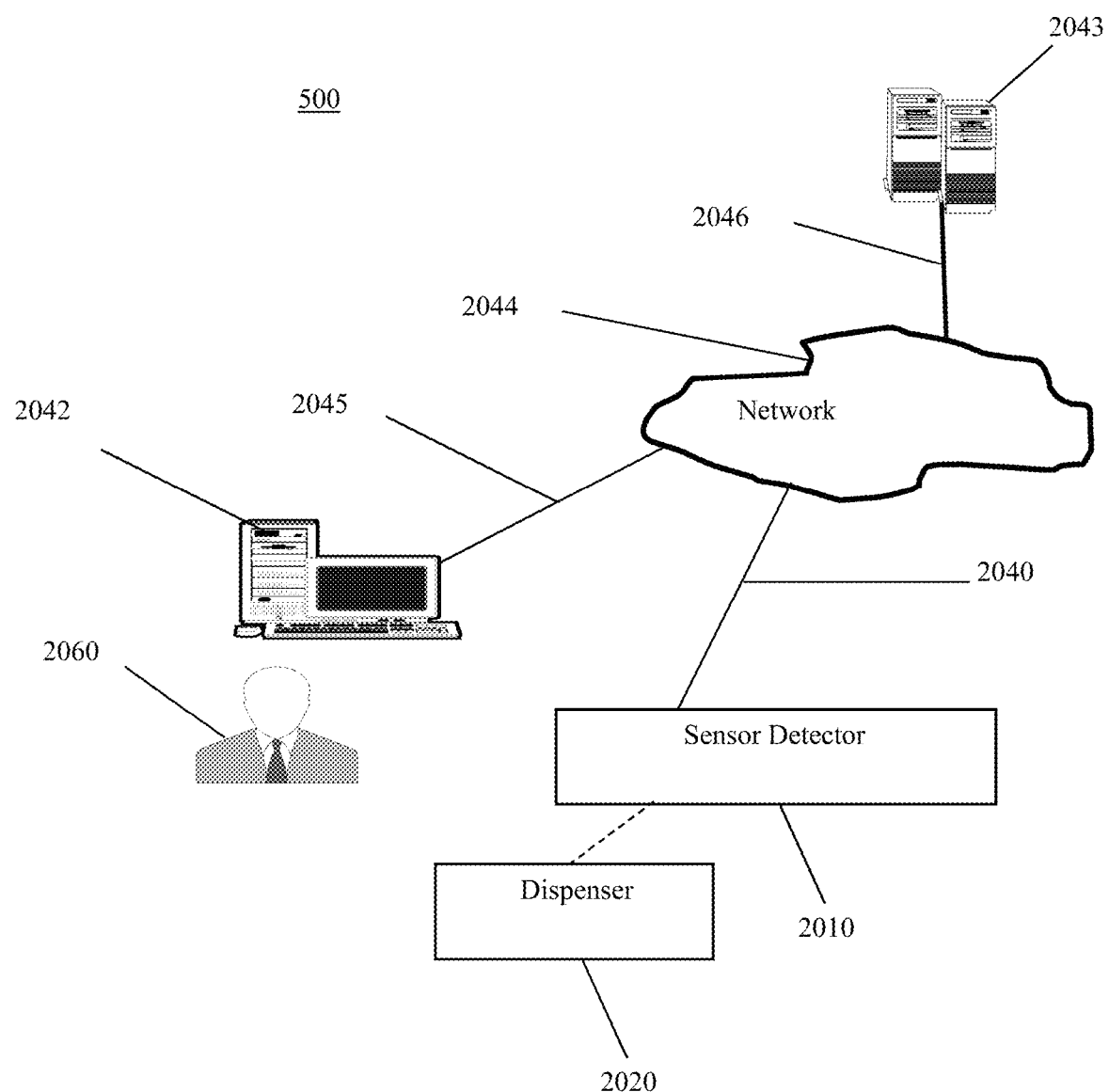
FIG. 5 shows another example implementation of various features of a system for use in accordance with aspects of the present disclosure.

As shown in FIG. 5, in another example implementation of a system 500 in accordance with aspects of the present disclosure, various features for use in conjunction devices and methods in accordance with aspects of present disclosure may include, but not limited to detecting, storing, transmitting, reviewing, analyzing, and preparing reports related to device activity, such as dispenser activation. In FIG. 5, sensor detector 2010 may, for example, detect and process (e.g., analyze and compare to known patterns) dispenser activity for a dispenser 2020 to which the detector 2010 is attached. The data and/or analysis results may be transmitted via a network 2044, such as the Internet and/or an intranet, to a server 2043, such as a personal computer (PC), minicomputer, mainframe computer, microcomputer, or other device having a processor and a repository for data and/or coupling to a processor and/or repository for data, via, for example, a network 2044, where the data and/or analysis results may be stored and/or where further processing may occur. An accessor 2060 (also referred to interchangeably herein as a "user") via a terminal 2042, such as a PC, minicomputer, mainframe computer, microcomputer, telephonic device, or wireless device, such as a hand-held wireless device may access the server 2043. Couplings 2040, 2045, 2046 may include, for example, wired, wireless, or fiberoptic links.

Figure 6:
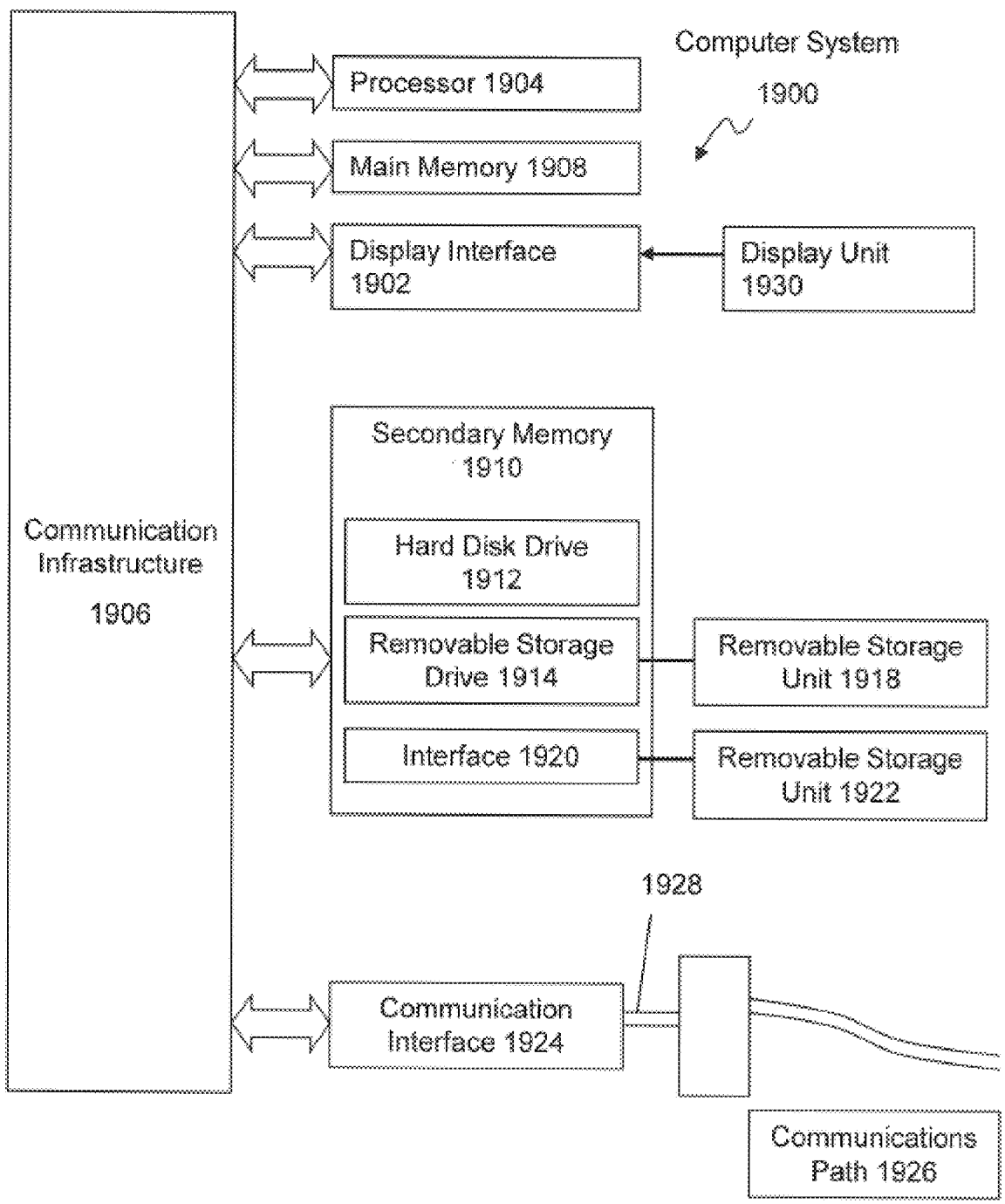
FIG. 6 shows a various features of an example computer system usable in accordance with aspects of the present disclosure.

Per above, aspects of the systems, devices, and methods in accordance with aspects of the present disclosure may include various computer systems and/or processors or other components thereof. An example of such a computer system 1900 is shown in FIG. 6.

Computer system 1900 includes one or more processors, such as processor 1904. The processor 1904 may be connected to a communication infrastructure 1906 (e.g., a communications bus, cross-over bar, or network). Various software aspects are described in terms of this example computer system. After reading this description, it will become apparent to a person skilled in the relevant art(s) how to implement the aspects hereof using other computer systems and/or architectures.

Computer system 1900 may include a display interface 1902 that forwards graphics, text, and other data from the communication infrastructure 1906 (or from a frame buffer not shown) for display on the display unit 1930. Computer system 1900 also includes a main memory 1908, preferably random access memory (RAM), and may also include a secondary memory 1910. The secondary memory 1910 may include, for example, a hard disk drive 1912 and/or a removable storage drive 1914, representing a floppy disk drive, a magnetic tape drive, an optical disk drive, etc. The removable storage drive 1914 may read from and/or write to a removable storage unit 1918 in a well-known manner. Removable storage unit 1918, may represent a floppy disk, magnetic tape, optical disk, etc., which is read by and written to removable storage drive 1914. As will be appreciated, the removable storage unit 1918 may include a computer usable storage medium having stored therein computer software and/or data.

In alternative variations, secondary memory 1910 may include other similar devices for allowing computer programs or other instructions to be loaded into computer system 1900. Such devices may include, for example, a removable storage unit 1922 and an interface 1920. Examples of such may include a program cartridge and cartridge interface (such as that found in video game devices), a removable memory chip (such as an erasable programmable read only memory (EPROM), or programmable read only memory (PROM)) and associated socket, and other removable storage units 1922 and interfaces 1920, which allow software and data to be transferred from the removable storage unit 1922 to computer system 1900.

Computer system 1900 may also include a communications interface 1924. Communications interface 1924 allows software and data to be transferred between computer system 1900 and external devices. Examples of communications interface 1924 may include a modem, a network interface (such as an Ethernet card), a communications port, a Personal Computer Memory Card International Association (PCMCIA) slot and card, etc. Software and data transferred via communications interface 1924 may be in the form of signals 1928, which may be electronic, electromagnetic, optical or other signals capable of being received by communications interface 1924. These signals 1928 may be provided to communications interface 1924 via a communications path (e.g., channel) 1926. This path 1926 may carry signals 1928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1914, a hard disk installed in hard disk drive 1912, and signals 1928. These computer program products provide software to the computer system 1900. Aspects of the invention are directed to such computer program products.

Computer programs (also referred to as computer control logic) are stored in main memory 1908 and/or secondary memory 1910. Computer programs may also be received via communications interface 1924. Such computer programs, when executed, enable the computer system 1900 to perform the features in accordance with aspects of the invention, as discussed herein. In particular, the computer programs, when executed, enable the processor 1904 to perform such features. Accordingly, such computer programs represent controllers of the computer system 1900.

In a variation where aspects of the present disclosure are implemented using software, the software may be stored in a computer program product and loaded into computer system 1900 using removable storage drive 1914, hard drive 1912, or communications interface 1924. The control logic (software), when executed by the processor 1904, may cause the processor 1904 to perform the functions as described herein. In another variation, aspects of the present disclosure are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present disclosure are implemented using a combination of both hardware and software.

FIGS. 7-24 show example graphical user interface (GUI) screens associated with a user interface for accessing and processing data, in accordance with aspects of the present disclosure. For example, such screens may be used in a user interface via terminal 2042 for user 2060 when accessing data stored at server 2043, as shown in FIG. 5.

Figure 7:
FIGS. 7-24 show example graphical user interface (GUI) screens associated with a user interface for accessing and processing data, in accordance with aspects of the present disclosure.

FIG. 7 shows an example GUI screen of an overview of various aspects relating to measuring system compliance based on data from a plurality of sensor devices in accordance with aspects of the present disclosure. The system has a number user input and selection options, as shown in the selection buttons on the left side of the screen, as well as additional interactive user features.

Figure 8:

FIG. 8 shows another GUI screen with a Report option button being selected, specifically relating to Dispenser Activity.

Figure 9:
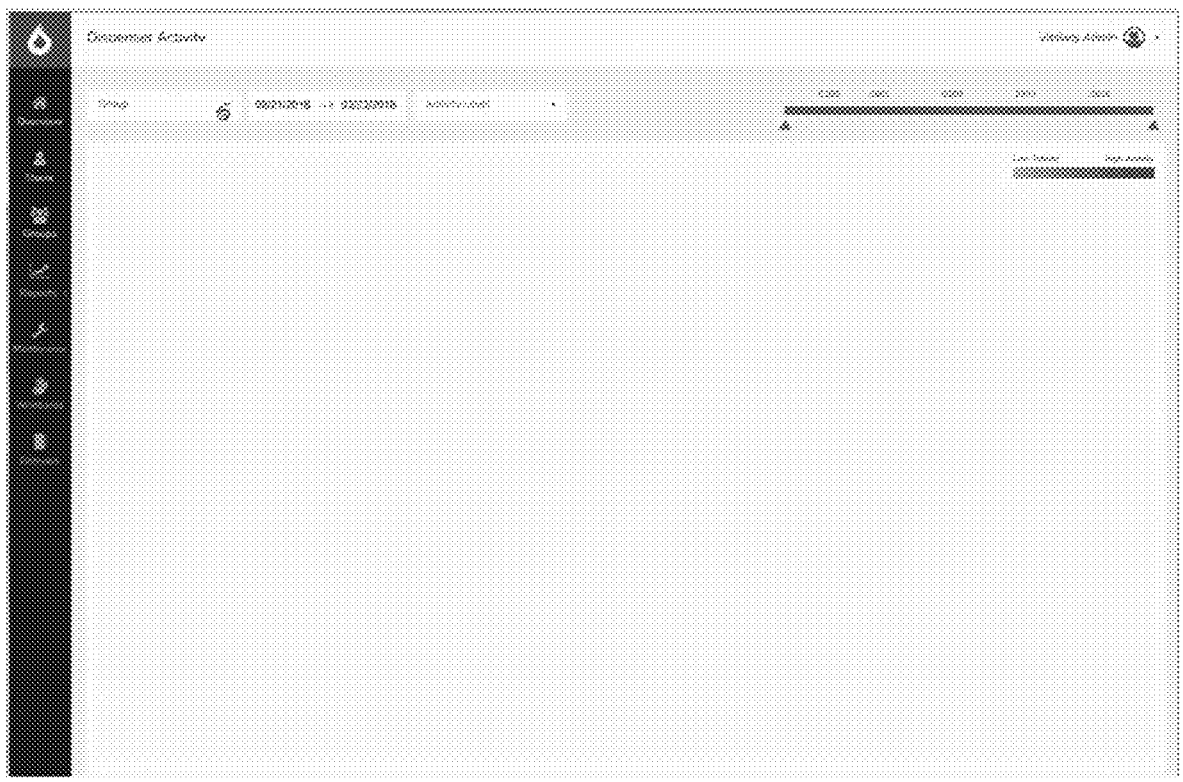
Figure 10:
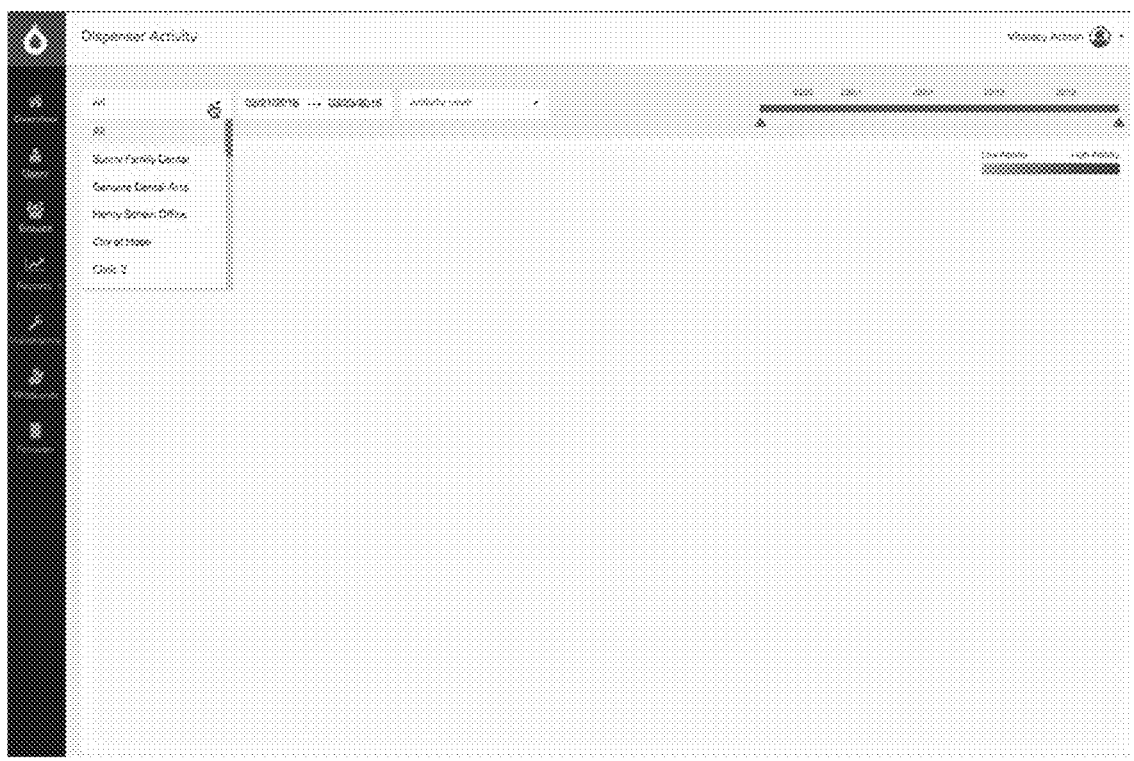
Figure 11:
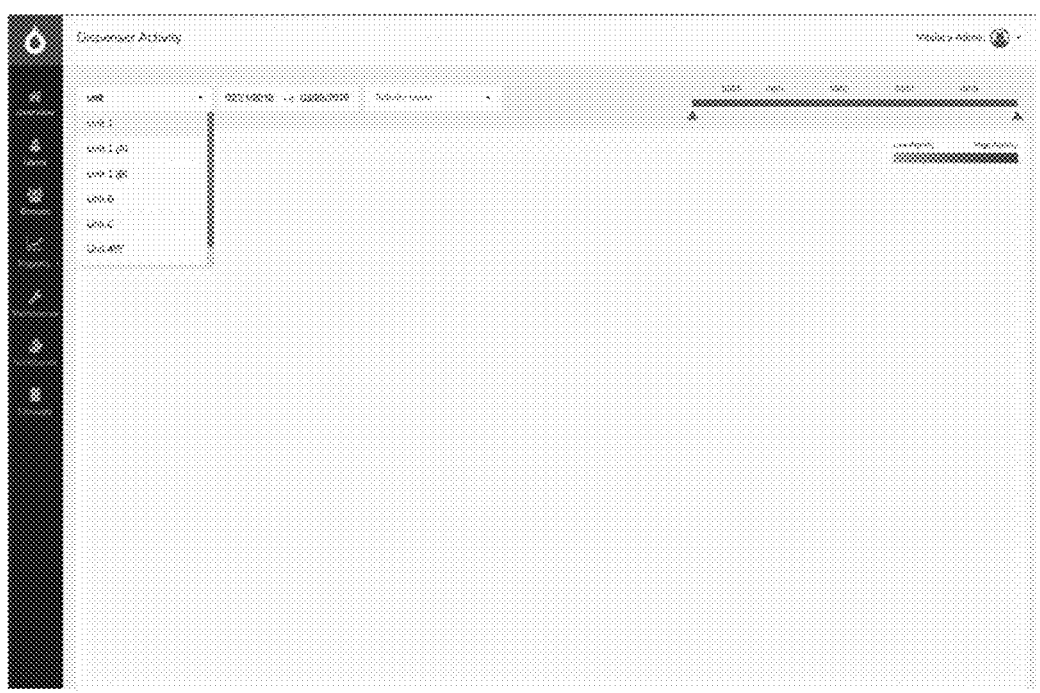
Figure 12:
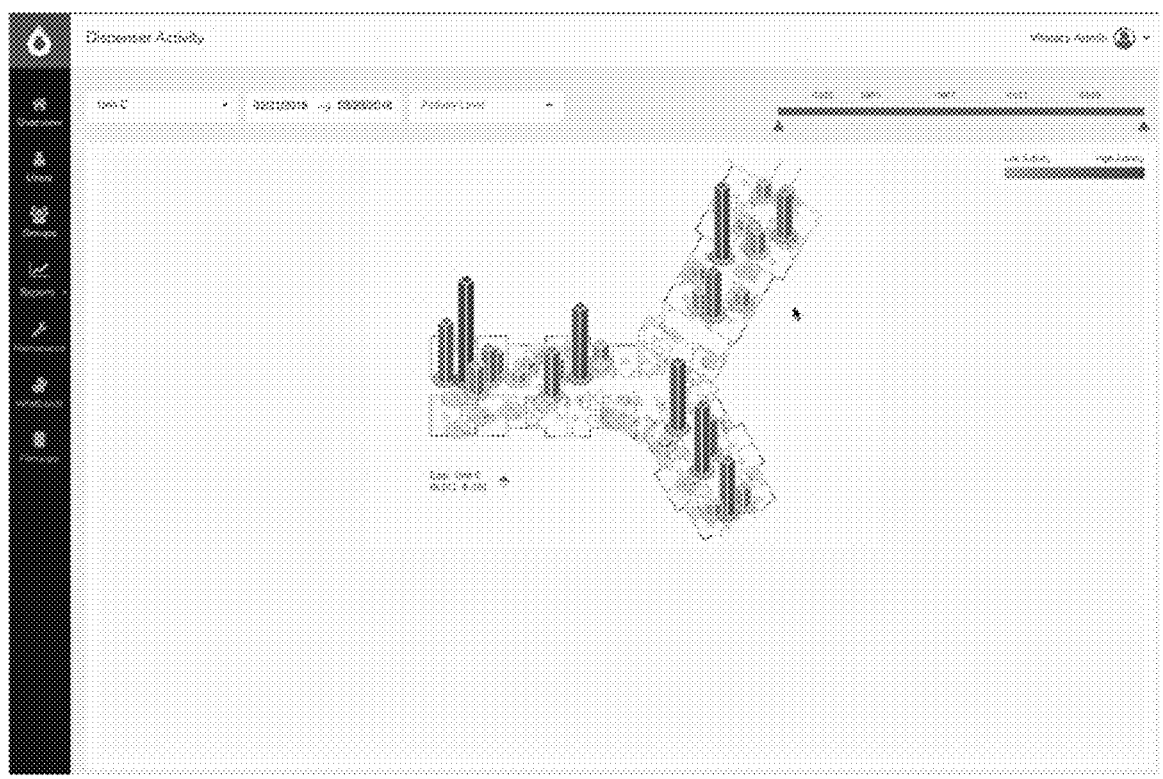

FIG. 9 show the GUI screen that appears after selection of Dispenser Activity in the GUI screen of FIG. 8. From the GUI screen of FIG. 9, the user may select a Group for further information. A pulldown menu appears as shown in FIG. 10, and the selection of a Unit from that list produces the GUI screen shown in FIG. 11. If a particular Unit, such as Unit C is selected from pulldown list on the GUI screen in FIG. 11, a graphical representation of the dispensers in Unit C appears as shown in the GUI screen of FIG. 12, including information relating to relative use, shown in three dimensional bar chart form, for example.

Figure 13:

FIG. 13 contains a GUI screen showing a selection (e.g., by a mouse click) of one of the dispensers for further details, which appear in the bar chart shown on the GUI screen. The bar chart details use by time of day.

Figure 14:

FIG. 14 shows the GUI screen of FIG. 13, but with a selection of an activity level being made. Upon selection of the High activity level in the GUI screen of FIG. 14, the GUI screen of FIG. 15 appears. This screen filters dispenser use so as only to show high use dispensers and their locations.

Figure 15:
Figure 16:
Figure 17:
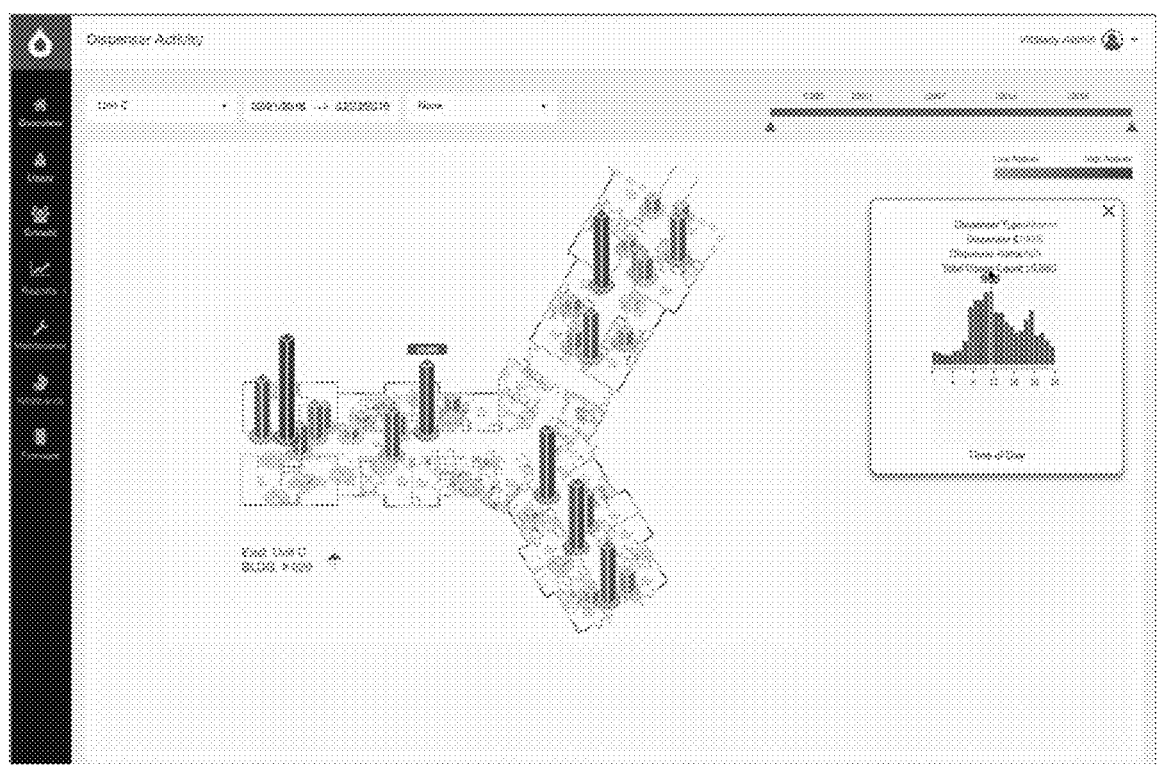

FIG. 16 shows a GUI screen similar to FIG. 15, but with the activity level filter being unselected. In FIG. 17, a particular time of day is selected from the time of day activity sub-chart, which results in the bar chart levels appearing as shown in the GUI screen of FIG. 17.

Figure 18:
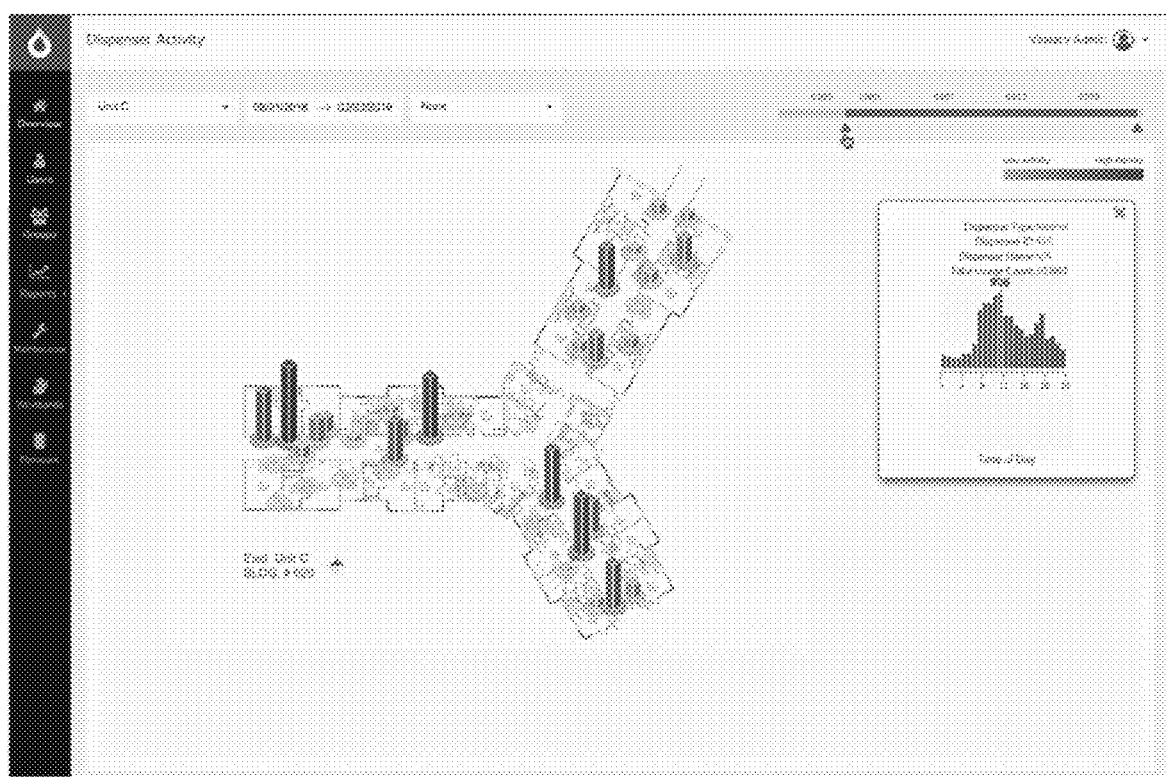
Figure 19:
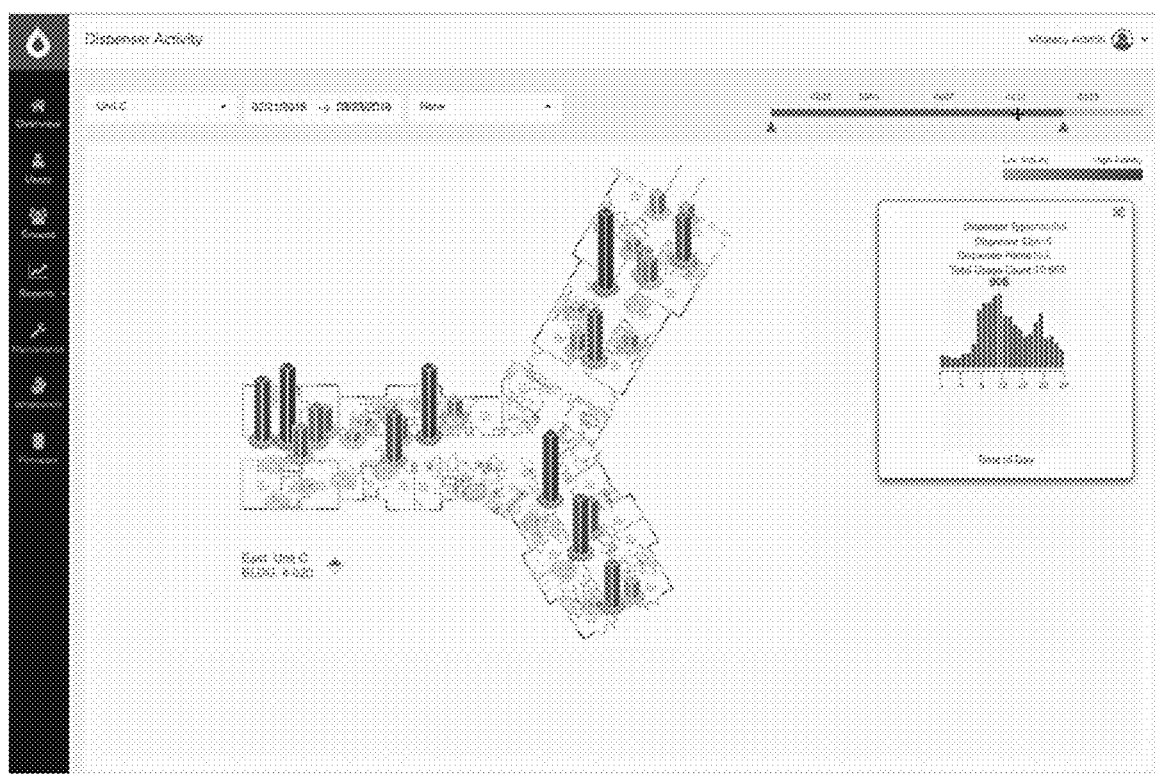

FIGS. 18 and 19 contain GUI screens showing changes in date range using the bar in the upper right.

Figure 20:
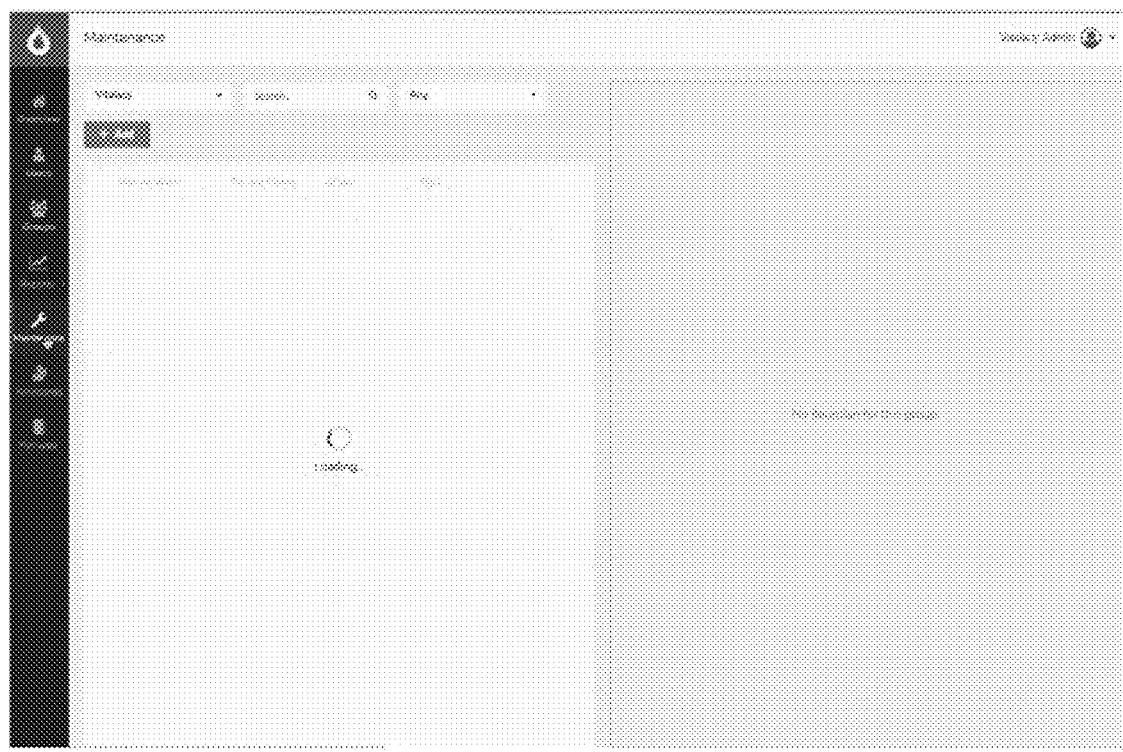
Figure 21:
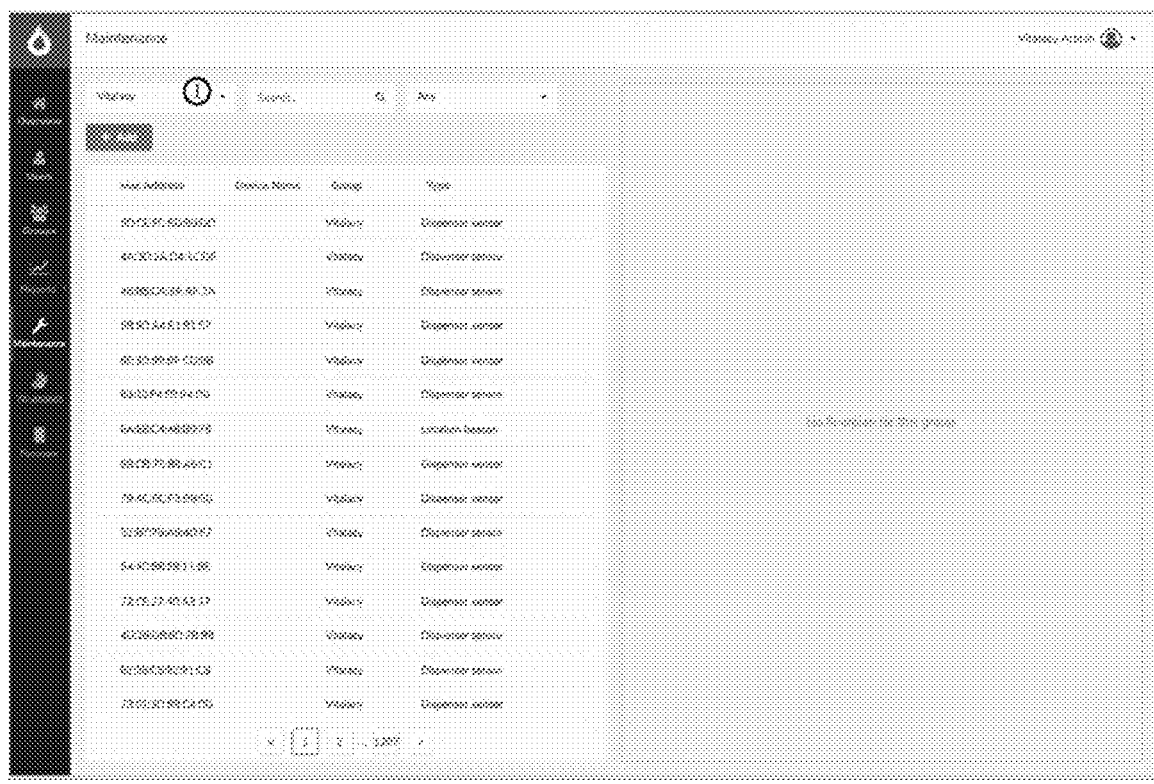
Figure 22:
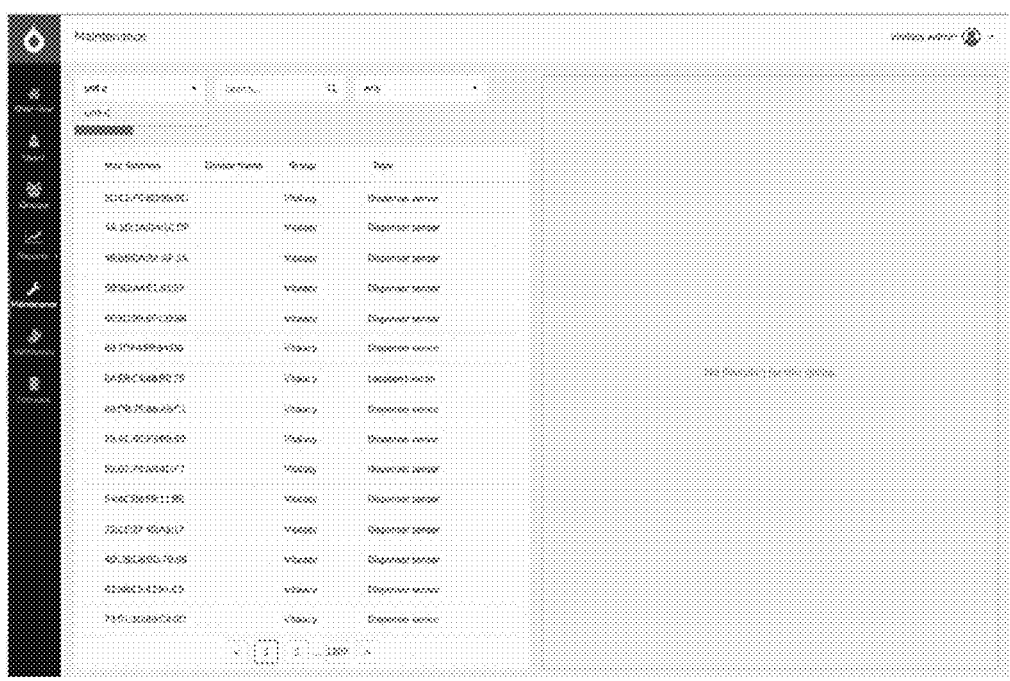
Figure 23:
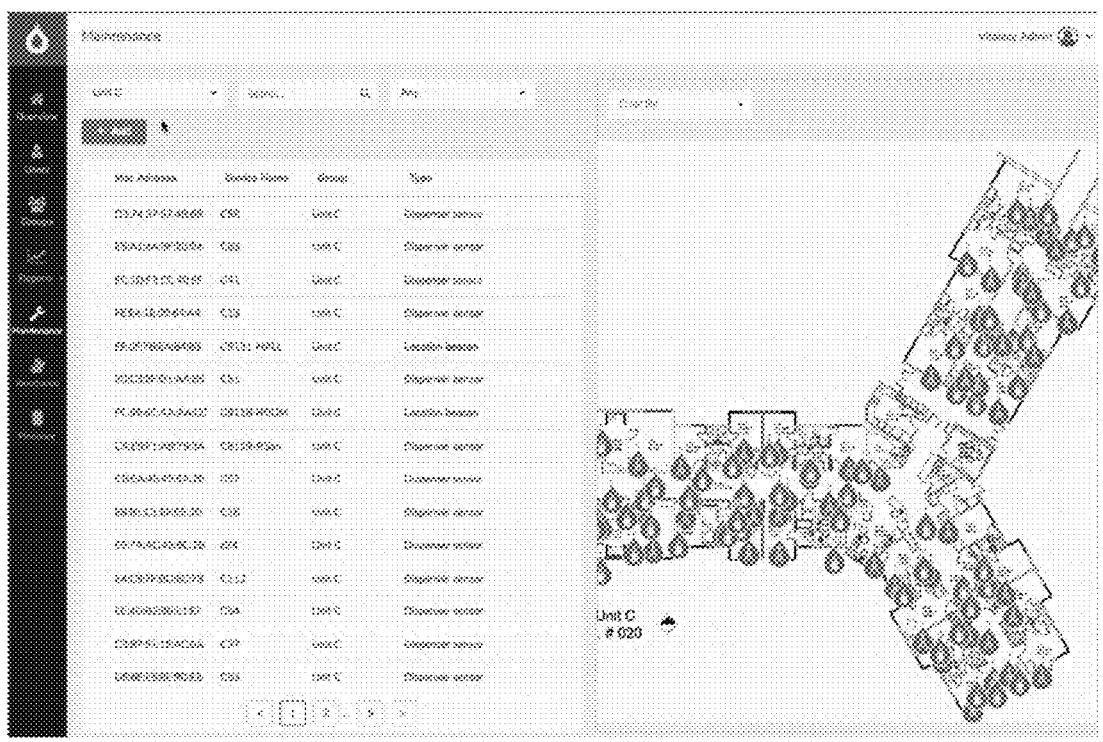

FIG. 20 shows a GUI screen in which the Maintenance button on the left side is being selected, which results in the GUI screen of FIG. 21 appearing. If a particular Unit is selected from the top pull down menu, such as Unit C, as shown in FIGS. 22 and 23, only the unit C maintenance information will be shown, including data about the dispensers and graphical representation of location and other information.

Figure 24:
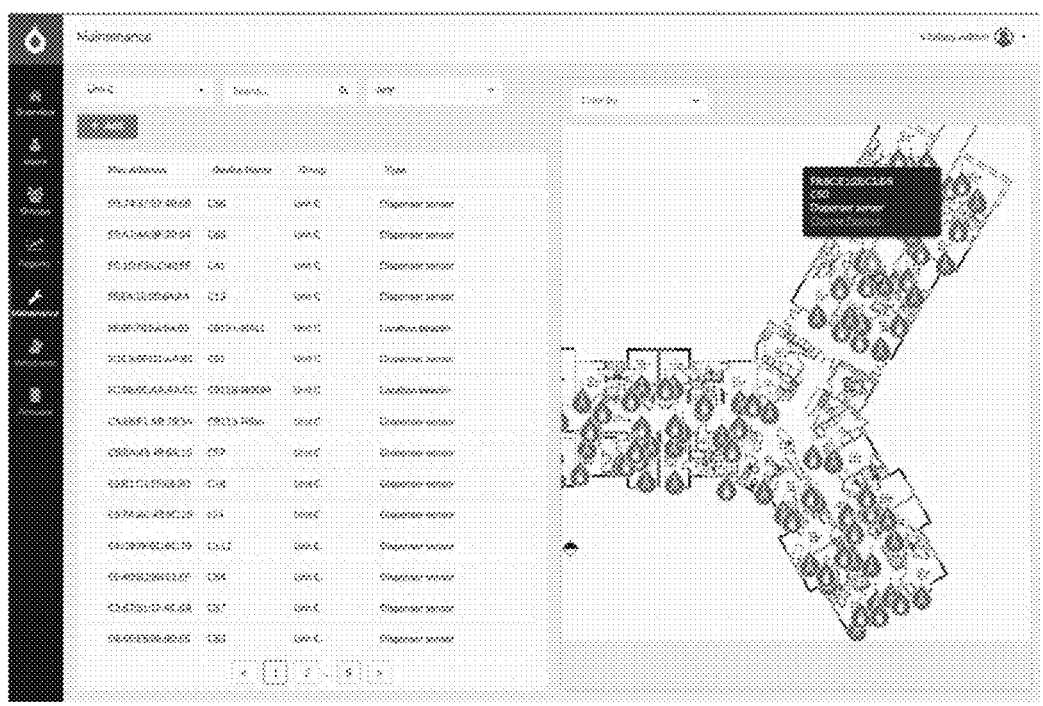

FIG. 24 shows a GUI screen with a particular dispenser being selected for further information details.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A sensor device for obtaining and analyzing activity data for a host device with which the sensor device is associated, the sensor device comprising:
   a sensor configured to detect of the host device, the sensor includes an accelerometer and the detected data is accelerations in x, y, and z directions;
   a memory storing data for an identified activity of the host device; and
   a processor configured to:
      store a database of motion patterns associated with a plurality of actions;
      format the detected data;
      compare locally at the sensor device the formatted detected data to the database of motion patterns associated with the plurality of actions;
      when the formatted detected data has a pattern that matches a stored motion pattern associated with the plurality of actions and satisfies a threshold, identify an action from the plurality of actions based on the comparison, and
      transmit the identified action to a remote server;
   wherein the sensor device is internal to the host device;
   wherein the database of motion patterns is predetermined and configured to be updated via a remote device;
   wherein the identified action is accessible to a user via a graphical user interface (GUI) via the remote server,
   wherein the plurality of actions includes dispensing fluid, slamming of a wall, and spurious motions.

2. The sensor device of claim 1, wherein the host device is a fluid dispenser.

3. The sensor device of claim 1, wherein the sensor further includes at least one selected from a gyroscope, an inertial measurement unit (IMU), a global positioning system (GPS) receiver, a wireless communication device, an optical reader, and a biometric detection device.

4. The sensor device of claim 1, wherein the identified activity for the host device includes dispensing a fluid.

5. The sensor device of claim 1, wherein the sensor further comprises a communication module.

6. The sensor device of claim 5, wherein the communication module is a wireless communication module.

7. The sensor device of claim 1, wherein the processor is further configured to transmit to a second remote device the identified activity for the host device.

8. The sensor device of claim 7, wherein the remote device is a server.

9. The sensor device of claim 8, wherein the server is coupled to a network.

10. The sensor device of claim 9, wherein the network is an Internet.

11. The sensor device of claim 1, further comprising a power supply.

12. The sensor device of claim 1, further comprising a coupling to a power supply of the host device.

13. The sensor device of claim 1, wherein the processor comprises a micro controller.

14. The sensor device of claim 1, wherein the identified activity being associated with one of a plurality of types of host devices.

15. The sensor device of claim 14, wherein the memory is further configured to associate the host device with a selected one of the plurality of types of host devices.

16. A method for automatically determining when a host device dispenses a fluid, the method comprising:
   attaching a sensor device to the host device, the sensor being configured to monitor host device activity;
   monitoring locally the host device activity via an accelerometer for accelerations in x, y, and z directions;
   causing the host device to dispense a fluid while the sensor is monitoring host device activity and detecting data;
   storing locally a database of motion patterns associated with a plurality of actions;
   formatting locally the detected data;
   comparing locally at the sensor device the formatted detected data to the database of motion patterns associated with the plurality of actions;
   when the formatted detected data has a pattern that matches a stored motion pattern associated with the plurality of actions and satisfies a threshold, identifying an action from the plurality of actions based on the comparison, and
   transmitting the identified action to a remote server;
   wherein the sensor device is internal to the host device;
   wherein the database of motion patterns is predetermined and configured to be updated via a remote device;
   wherein the identified action is accessible to a user via a graphical user interface (GUI) via the remote server,
   wherein the plurality of actions includes dispending fluid, slamming of a wall, and spurious motions.

* * * * *